(12) United States Patent
Capper et al.

(10) Patent No.: US 11,258,727 B2
(45) Date of Patent: Feb. 22, 2022

(54) SHARED ROUTING TABLES FOR NETWORK DEVICES

(71) Applicant: Arista Networks, Inc., Santa Clara, CA (US)

(72) Inventors: Simon Capper, San Jose, CA (US); Navdeep Bhatia, Sunnyvale, CA (US); Michael Wang, Vancouver (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 104 days.

(21) Appl. No.: 16/682,731

(22) Filed: Nov. 13, 2019

(65) Prior Publication Data

US 2021/0144104 A1    May 13, 2021

(51) Int. Cl.
*H04W 56/00* (2009.01)
*H04L 49/00* (2022.01)
*H04L 61/256* (2022.01)

(52) U.S. Cl.
CPC ........ *H04L 49/3009* (2013.01); *H04L 61/256* (2013.01)

(58) Field of Classification Search
CPC .......................... H04L 49/3009; H04L 61/256
USPC ........................................................ 370/389
See application file for complete search history.

(56) References Cited

U.S. PATENT DOCUMENTS

| | | | | |
|---|---|---|---|---|
| 2004/0066788 A1* | 4/2004 | Lin | ................... | H04L 29/12783 370/401 |
| 2005/0286511 A1* | 12/2005 | Johnsen | ................ | H04L 63/126 370/389 |
| 2010/0091685 A1* | 4/2010 | Agrawal | ................. | H04L 45/28 370/254 |
| 2014/0195666 A1* | 7/2014 | Dumitriu | ................ | H04L 49/70 709/223 |

\* cited by examiner

*Primary Examiner* — Sai Ming Chan
(74) *Attorney, Agent, or Firm* — Fountainhead Law Group P.C.

(57) ABSTRACT

Techniques for configuring shared routing tables for network devices are provided. In some embodiments, a shared routing context is configured to include common routes across several local routing contexts. When a first packet is received at a first local routing context that is to be routed using one of the common routes, NAT operations may be performed on the first packet and then the shared routing context is used to process the first packet. Similarly, when a second packet is received at a second local routing context that is to be routed using the same common route, NAT operations may be performed on the second packet and then the shared routing context is used to process the second packet.

20 Claims, 6 Drawing Sheets

SHARED ROUTING TABLES FOR NETWORK DEVICES

BACKGROUND

Some network devices can be configured with several routing tables. Each routing table may be configured to process packets received at a particular set of interfaces of the network device. These routing tables may not share routes. Thus, packets are only forwarded between interfaces for which a routing table is configured to process packets. Often times many of the routing tables can each have the same routes (e.g., routes to network hosts in a public network such as the Internet). Because routing tables do not share routes, the same routes are duplicated into each routing table. This introduces a scalability problem if there are many of the same routes and/or many routing tables configured in the network device because the network device can run out of resources.

Traditional network address translation (NAT) solutions for computer networks typically perform packet routing of a packet and determine an egress interface through which the packet is forwarded. An egress interface may be configured to perform NAT operations on packets that are forwarded out of the egress interface. Thus, if the egress interface determined for a packet is such a configured egress interface, NAT operations are performed on the packet. Some of these traditional NAT solutions are implemented using multiple devices. For example, a first device may be configured to perform the routing and a second device coupled to an egress interface of the first device may be configured to perform the NAT operations.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for configuring shared routing tables for network devices. In some embodiments, a network device is configured with several local routing contexts and a shared routing context. A local routing context may be configured to process packets received at one or more network interfaces of the network device and may include routes for routing packets between the one or more network interfaces. A shared routing context can include shared routes that may be utilized by some or all the local routing context for routing packets. When a packet that is to be routed using a shared route in the shared routing context, the local routing context that receives the packet can pass it to the shared routing context for processing. In this manner, common routes among local routing contexts may be configured in a single routing context and shared across the local routing contexts. By eliminating duplicate common routes across the local routing contexts, this technique reduces the amount of resources used in the network device, thereby improving the scalability of the network device.

In addition, local routing contexts can be configured to perform NAT operations on packets that are to be routed by a common route in the shared routing context. This way, when a local routing context receives such a packet, the local routing context performs the specified NAT operations on the packet and then passes the packet to the shared routing context for processing. This novel feature allows NAT operations to be performed across multiple local routing contexts within a single network device. Also, by configuring local routing contexts to perform NAT operations, a packet can first have NAT operations performed on it by a local routing context and then the packet can be routed by the shared routing context (unlike conventional NAT solutions where a packet is first routed and then NAT operations are performed on the packet).

1. Example Network Device

Figure 1:
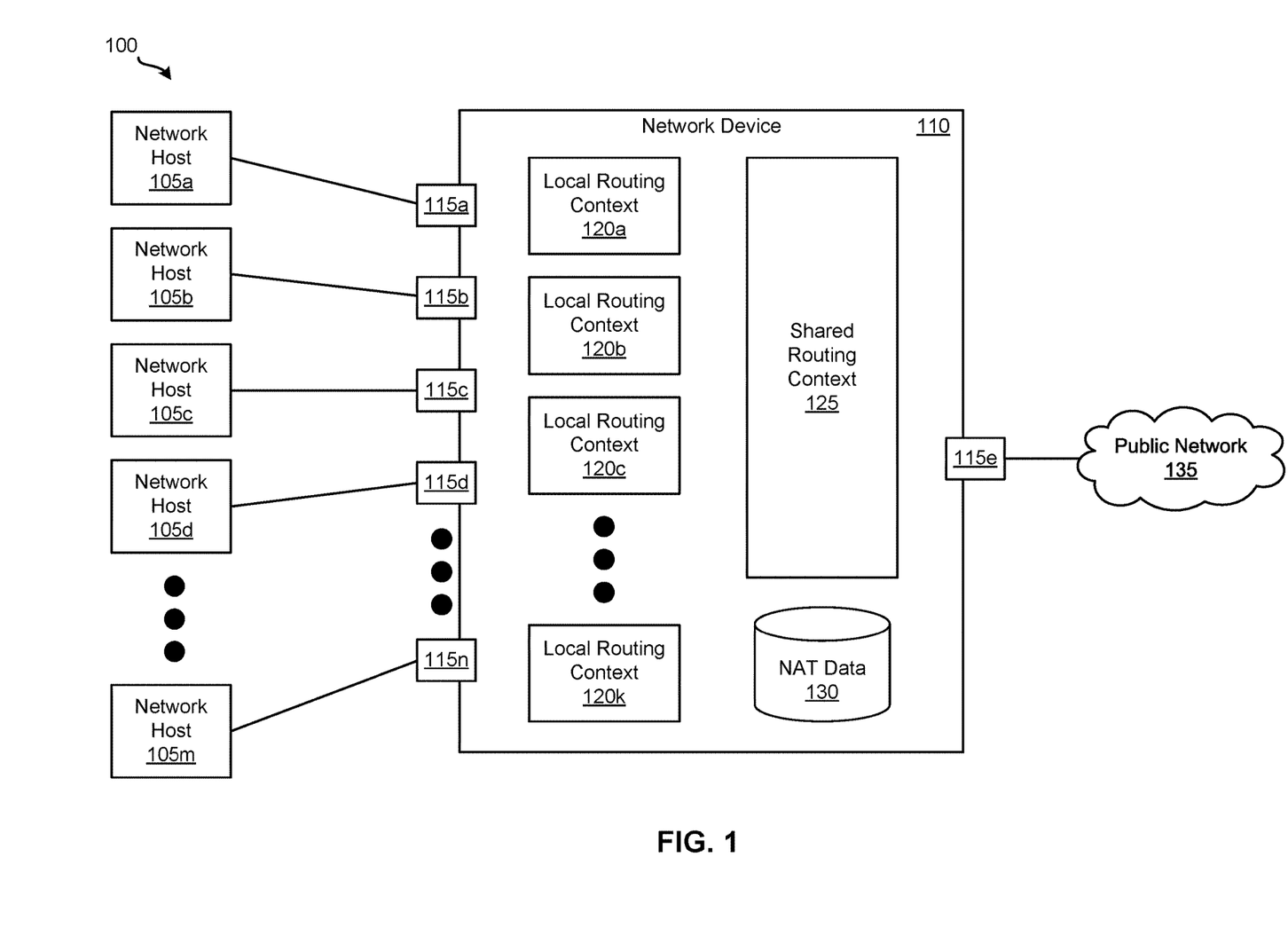
FIG. 1 illustrates a system that includes a network device according to some embodiments.

FIG. 1 illustrates a system 100 that includes a network device according to some embodiments. As shown, system 100 includes network hosts 105a-105m, network device 110, and public network 135. Public network 135 can include any number of publicly accessible network hosts (not shown). In some embodiments, public network 135 is a network of networks, such as the Internet. Each of the network hosts 105a-105m and the networks hosts in public network 135 may be a computing device (e.g., a desktop computer, a laptop, a smartphone, a tablet, a server, etc.) configured to send data to and receive data from some or all other network hosts 105 and/or publicly accessible network hosts in public network 135.

As illustrated in FIG. 1, network device 110 includes network interfaces 115a-115n, local routing contexts 120a-120k, shared routing context 125, and NAT data storage 130. NAT data storage 130 can store data associated with NAT operations. For example, NAT data storage 130 may store mappings that map local Internet Protocol (IP) addresses and local routing contexts to public IP addresses, mappings that map local IP addresses and local routing contexts to public IP addresses and ports, and mappings that map local IP addresses, ports, and local routing contexts to public IP addresses and ports.

Each of the network interfaces 115a-115n is configured to receive data (e.g., packets) from, and transmit data to, network hosts 105a-105m communicatively coupled to the network interface and/or network hosts in public network 135. In this example, network host 105a is communicatively coupled to interface 115a, network host 105b is communicatively coupled to interface 115b, network host 105c is communicatively coupled to network interface 115c, etc. Network interface 115e is communicatively coupled to network hosts in public network 135. One of ordinary skill in the art will understand that network hosts 105a-105m may be communicatively coupled to network interfaces 115*a*-115*n* in any number of different ways. For instance, multiple network hosts 105 can be communicatively coupled to a single network interface 115 (e.g., several network hosts 105 may be communicatively coupled to a network device, which, in turn, is communicatively coupled to a network interface 115).

Local routing contexts 120*a*-120*k* may be configured to process packets for network interfaces 115. For example, a local routing contexts 120 can be configured to process packets for one or more network interfaces 115*a*-115*n*. In some embodiments, only one local routing context 120 may be configured to process packets for a particular network interface 115. Each local routing context 120 can include a routing table that is used to forward packets between network interfaces 115 for which the local routing context 120 is configured. Stated differently, when a local routing context 120 receives a packet, the local routing context 120 routes the packet within the local routing context 120 based on the routing table. In some embodiments, each local routing context 120 acts as an independent routing table in network device 110.

Additionally, each local routing context 120 may be configured to send packets to shared routing context 125 for processing. Different embodiments may use different methods for determining whether to send a packet to shared routing context 125 for processing. For example, in some embodiments, a local routing context 120 can be configured to send a packet to shared routing context 125 when a lookup of the routing table of the local routing context 120 using the destination IP address of the packet results in a miss (i.e., the destination IP address of the packet does not match any route in the routing table). In other embodiments, an entry in the routing table of a local routing context 120 can be hard coded to send packets to shared routing context 125. For instance, the routing table of a local routing context 120 may be configured with an entry that specifies a route (e.g., a network prefix) and specifies to send a packet to shared routing context 125 if the packet matches the route. In some embodiments, access control lists (ACLs) may be used to determine whether to send a packet to shared routing context 125 for processing. One of ordinary skill in the art will recognize that other techniques for determining whether to send a packet to shared routing context 125 for processing are possible.

In some embodiments, each of the local routing contexts 120*a*-120*k* can be configured to perform NAT operations on a packet before sending the packet to shared routing context 125 for processing. In some cases, network device 110 is configured with multiple public IP addresses. For example, each local routing context 120 can be allocated its own public IP address. In some such cases, each local routing context 120 performs NAT operations on a packet by replacing the source IP address of the packet with the public IP address allocated to the local routing context 120. This may be referred to as performing source NAT (SNAT) operations on the packet. The local routing context 120 also stores in NAT data storage 130 a mapping that maps the local routing context 120 (e.g., using a unique identifier associated with the local routing context 120) and the original source IP address of the packet (also referred to as the local source IP address) to the public IP address allocated to the local routing context 120. In some embodiments, the mapping that the local routing context 120 stores in NAT data storage 130 maps the local routing context 120 and the local source IP address to the public IP address allocated to the local routing context 120 and the original source port of the packet (also referred to as the local source port).

In other cases, network device 110 is configured with one public IP address. In some such other cases, each local routing context 120 is assigned a range of port numbers. For instance, local routing context 120*a* can be assigned ports 0-999; local routing context 120*b* can be assigned ports 1000-1999; local routing context 120*c* can be assigned ports 2000-2999; and so on and so forth. When a local routing context 120 performs NAT operations on a packet, the local routing context 120 replaces the source IP address of the packet with the public IP address configured for network device 110 and replaces the source port of the packet with an unused source port selected from the range of source ports assigned to the local routing context 120. Instead of assigning different ranges of ports numbers to local routing contexts 120*a*-120*k*, port numbers can be dynamically selected and assigned to each unique stream of packets in some embodiments (e.g., using a network address and port translation (NAPT) technique). Regardless of the method employed to selecting source ports, the local routing context 120 may, as part of the NAT operations on the packet, store in NAT data storage 130 a mapping that maps the local routing context 120, the local source IP address, and the local source port to the public IP address configured for network device 110 and the selected source port (also referred to as a public source port).

Each local routing context 120 may receive packets from shared routing context 125 for processing. For example, when a local routing context 120 receives a packet from shared routing context 125, the local routing context 120 performs a lookup of the routing table of the local routing context 120 using the destination IP address of the packet. Based on the lookup, the local routing context 120 forwards the packet (e.g., through one of the network interfaces 115 for which the local routing context 120 is configured) so the packet can reach its destination (e.g., a network host 105 having the IP address specified in the destination IP address field of the packet).

Shared routing context 125 is responsible for handling routes that are common across two or more local routing contexts 120*a*-120*k*. For instance, shared routing context 125 may include a routing table that is configured to store public routes that are common across two or more local routing contexts 120*a*-120*k*. Instead of configuring each of the local routing contexts 120*a*-120*k* with common routes, the common routes are configured in shared routing context 125. In some embodiments, a public route is a route to one or more publicly accessible network hosts in public domain 135. Shared routing context 125 can forward packets out network interfaces 115 (network interface 115*e* in this example) for which shared routing context 125 is configured. That is, when shared routing context 125 receives a packet, shared routing context 125 routes the packet within shared routing context 125. In some embodiments, shared routing context 125 acts like an independent routing table in network device 110.

Shared routing context 125 is also responsible for routing packets to networks hosts in public network 135. For example, when shared routing context 125 receives a packet from a local routing context 120, shared routing context 125 performs a lookup of the routing table of the shared routing context 125 using the destination IP address of the packet. Based on the lookup, if shared routing context 125 finds a matching entry in the routing table, shared routing context 125 forwards the packet based on the matching entry so that the packet reaches the destination IP address specified in the packet. For instance, shared routing context 125 may modify the destination MAC address to be the MAC address of the next hop and then forward the packet to the next hop (e.g., using an egress port connected to the next hop) so that the packet can reach its destination (i.e., the network host having the IP address specified in the destination IP address field of the packet).

As explained above, local routing contexts 120a-120k can perform NAT operations on packets destined for network hosts in public network 135 and then send those packets to shared routing context 125 for forwarding to the network hosts in public network 135. In some instances, shared routing context 125 may receive packets back from the network hosts in public network 135. Upon receiving such a packet from a network host in public network 135, shared routing context 125 checks whether a mapping exists in NAT data storage 130 that includes the destination IP address of the packet. For example, in some embodiments where each local routing context 120 is allocated its own public IP address, shared routing context 125 checks whether a mapping exists in NAT data storage 130 that includes a public IP address that matches the destination IP address of the packet. As mentioned above, in some such embodiments, the mappings stored in NAT data storage 130 maps a local routing context 120 (e.g., using a unique identifier associated with the local routing context 120) and a local source IP address to a public IP address allocated to the local routing context 120. If shared routing context 125 determines a mapping exists for the packet, shared routing context 125 replaces the destination IP address of the packet with the local source IP address in the mapping. This may be referred to as performing destination NAT (DNAT) operations on the packet. For embodiments where the mappings stored in NAT data storage 130 maps a local routing context 120 and a local source IP address to a public IP address allocated to the local routing context 120 and a local source port, shared routing context 125 checks whether a mapping exists in NAT data storage 130 that includes a public IP address that matches the destination IP address of the packet and a local source port that matches the source port of the packet. If shared routing context 125 determines such a mapping exists for the packet, shared routing context 125 replaces the destination IP address of the packet with the local source IP address in the mapping. Once shared routing context 125 performs DNAT operations on the packet, shared routing context 125 sends the packet to the local routing context 120 specified in the mapping.

As described above, in some embodiments where network device 110 is configured with one public IP address, NAT data storage 130 can store mappings that map a local routing context 120, a local source IP address, and a local source port to a public IP address configured for network device 110 and a public source port. In some such embodiments, when shared routing context 125 receives a packet back from a network host in public network 135, shared routing context 125 checks whether a mapping exists in NAT data storage 130 that includes a public IP address that matches the destination IP address of the packet and a public source port that matches the source port of the packet. If so, shared routing context 125 replaces the destination IP address of the packet with the local source IP address in the mapping and replaces the destination source port of the packet with the local source port in the mapping. Shared routing context 125 then sends the packet to the local routing context 120 specified in the mapping.

In some embodiments, local routing contexts 120a-120k and shared routing context 125 can be programmed by a user of network device 110 via an interface (e.g., a command line interface (CLI), a graphical user interface (GUI), etc.) provided by network device 110. In some instances, local routing contexts 120a-120k and shared routing context 125 may be implemented as virtual routing and forwarding (VRF) instances. FIG. 1 shows one shared routing context. One of ordinary skill in the art will appreciate that any number of additional shared routing contexts may be employed. For example, different shared routing contexts can be configured to manage different subsets of public routes.

2. Example Outbound Processing

Figure 2:
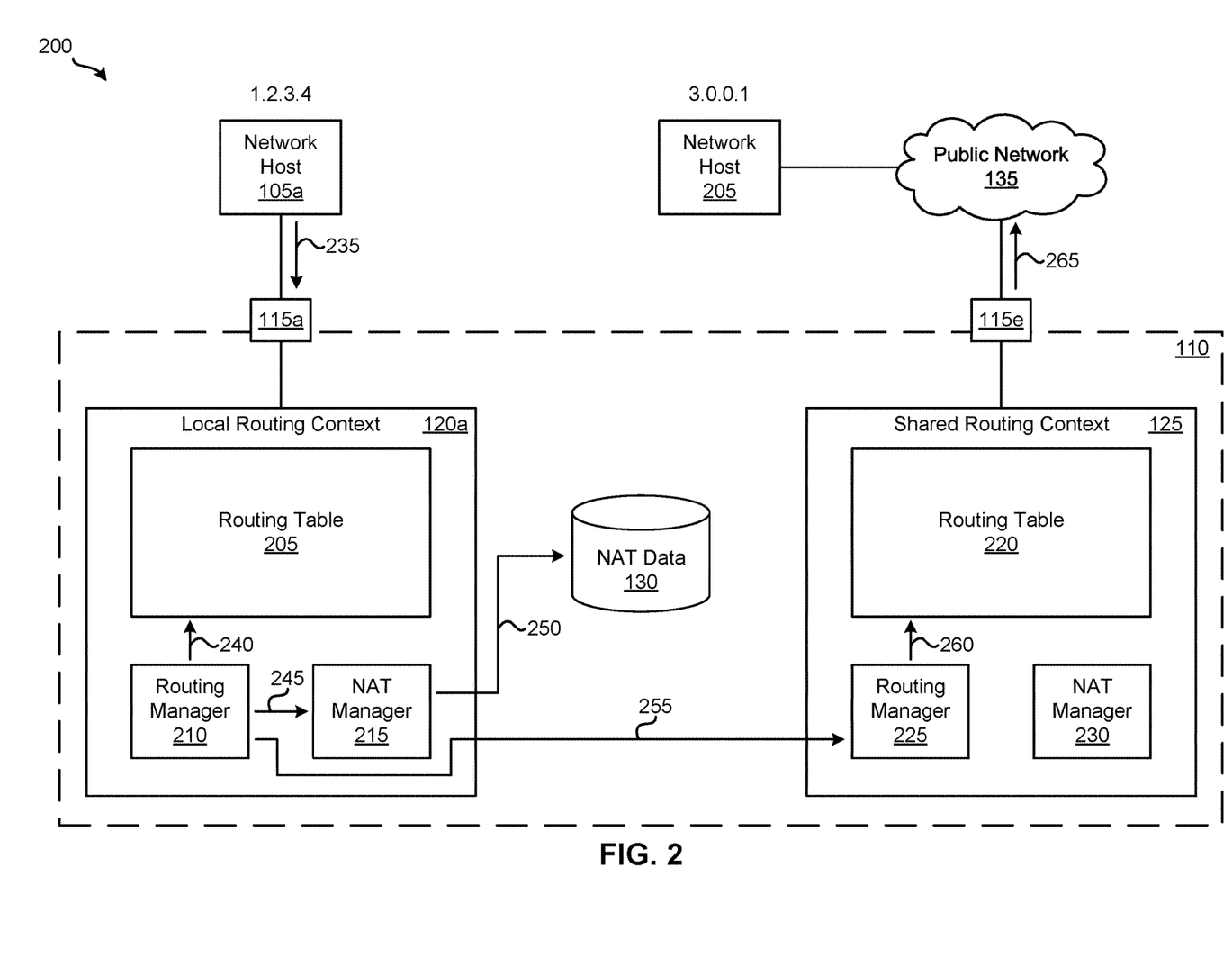
FIG. 2 illustrates an example outbound processing data flow through the network device illustrated in FIG. 1 according to some embodiments.

An example operation of network device 110 will now be described by reference to FIG. 2. FIG. 2 illustrates an example outbound processing data flow 200 through network device 110 according to some embodiments. Specifically, data flow 200 represents a logical data flow through network device 110. As shown in FIG. 2, in this example, local routing context 120a is configured to process packets for network interface 115a. FIG. 2 also illustrates that local routing context 120a includes routing table 205, routing manager 210, and NAT manager 215. Routing table 205 is configured to store routes for processing packets received at network interface 115a and received from shared routing context 125. In some embodiments, each entry in routing table 205 specifies a route (e.g., a network prefix) and a set of operations to perform. When a packet matches a route of an entry in routing table 205, the set of operations specified in the entry are performed on the packet. Routing manager 210 is responsible for managing the routing of packets within local routing context 120a while NAT manager 215 is responsible for performing NAT operations on packets.

Additionally, for this example, shared routing context 125 is configured to forward packets to network hosts (e.g., network hosts 205) in public network 135 via network interface 115e. As shown, shared routing context 125 includes routing table 220, routing manager 225, and NAT manager 230. Routing table 220 is configured to store public routes common across two or more local routing contexts 120a-120k. Routing manager 225 manages the routing of packets for shared routing context 125. NAT manager 230 handles NAT operations on packets.

The example operation starts by network device 110 receiving, at 235, a packet from network host 105a via network interface 115a. In this example, the packet is destined for network host 205. Therefore, the source IP address of the packet is 1.2.3.4 and the destination IP address of the packet is 3.0.0.1. Also, for this example, the source port of the packet is 1010. Upon local routing context 120a receiving the packet, routing manager 210 performs, at 240, a lookup of routing table 205 using the destination IP address of the packet. In this example, the destination IP address of the packet does not match any route in routing table 205 so the lookup results in a lookup miss.

For this example, local routing context 120a is configured to perform a set of NAT operations on the packet when a lookup miss occurs. In addition, local routing context 120a is allocated its own public IP address of 20.0.0.1. In response to the lookup miss, routing manager 210 instructs, at 245, NAT manager 215 to perform the set of NAT operations on the packet. In this example, the set of NAT operations include replacing the source IP address of the packet with the public IP address allocated to local routing context 120a. Accordingly, NAT manager 215 replaces the source IP address of the packet (1.2.3.4 in this example) with the public IP address allocated to local routing context 120*a* (20.0.0.1 in this example). Next, NAT manager 215 stores, at 250, a mapping in NAT data storage 130 that maps local routing context 120*a* and the original source IP address of the packet (1.2.3.4 in this example) to the public IP address allocated to the local routing context 120*a* (20.0.0.1 in this example) and the source port of the packet (1010 in this example). The following Listing 1 conceptually illustrates the mapping that NAT manager 215 stores in NAT data storage 130:

LRC 120*a*, 1.2.3.4↔20.0.0.1, 1010

Listing 1

Routing manager 210 then sends, at 255, the packet to shared routing context 125 for processing. Upon receiving the packet, routing manager 225 performs, at 260, a lookup of routing table 220 using the destination IP address of the packet (3.0.0.1 in this example). For this example, an entry in routing table 220 specifies a route that matches the destination IP address of the packet and specifies network interface 115*e* as the egress network interface. Therefore, the lookup results in routing manager 225 finding the entry as a match for the packet. In response to the lookup, routing manager 225 modifies the destination MAC address of the packet with the MAC address of the next hop and then forwards, at 265, the packet to the next hop through network interface 115*e* so the packet can reach network host 205 via public network 135.

Figure 3:
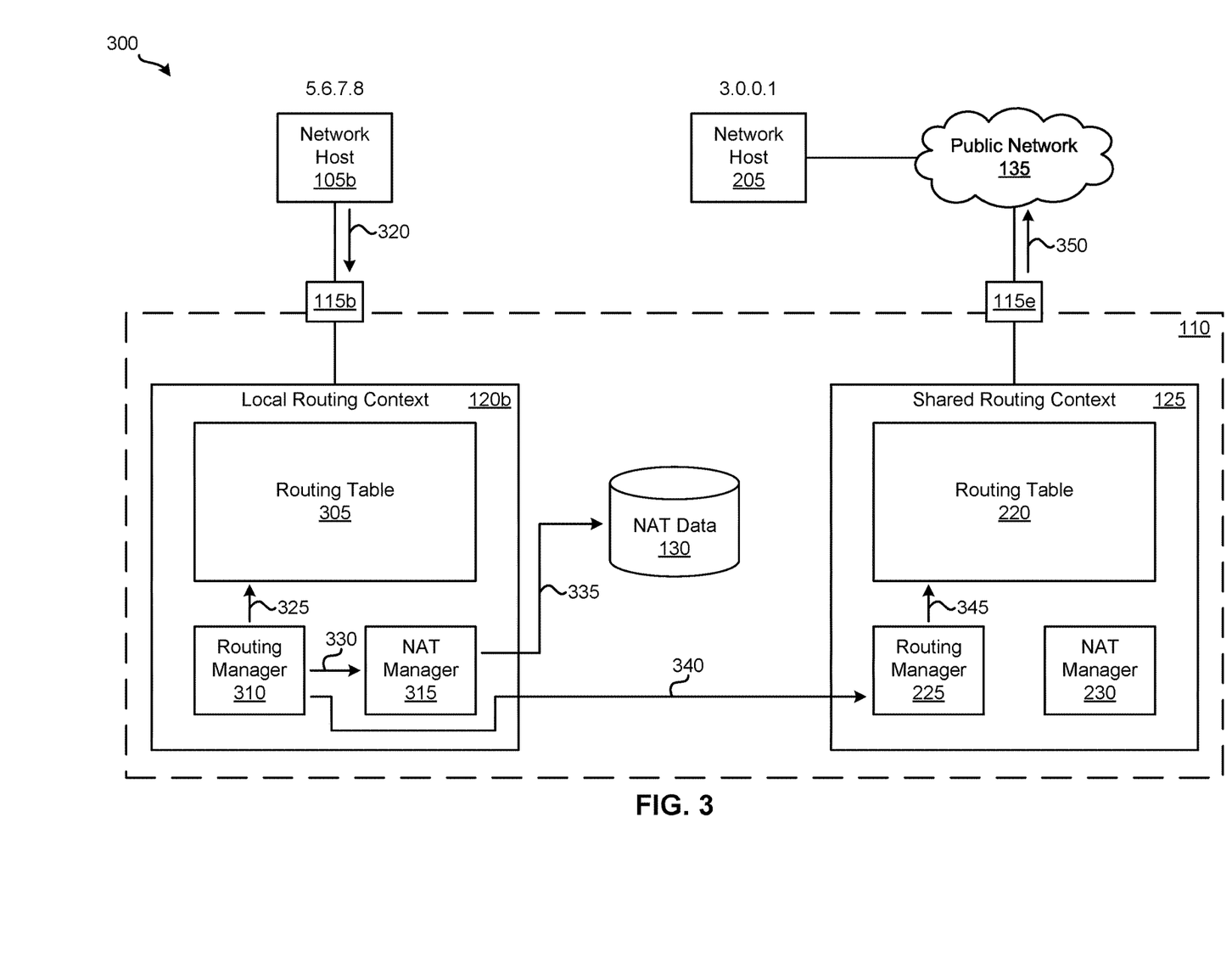
FIG. 3 illustrates another example outbound processing data flow through the network device illustrated in FIG. 1 according to some embodiments.

Another example operation of network device 110 will now be described by reference to FIG. 3. FIG. 3 illustrates another example outbound processing data flow 300 through network device 110 according to some embodiments. In particular, data flow 300 represents another logical data flow through network device 110. As illustrated in FIG. 3, local routing context 120*b* is configured to process packets for network interface 115*b* for this example. FIG. 3 also shows that local routing context 120*b* includes routing table 305, routing manager 310, and NAT manager 315. Routing table 305 is configured to store routes for processing packets received at network interface 115*b* and received from shared routing context 125. Each entry in routing table 305 specifies a route (e.g., a network prefix) and a set of operations to perform in some embodiments. When a packet matches a route of an entry in routing table 305, the set of operations specified in the entry are performed on the packet. Routing manager 310 is configured to manage the routing of packets within local routing context 120*b*. NAT manager 315 performs NAT operations on packets.

This example operation begins by network device 110 receiving, at 320, a packet from network host 105*b* through network interface 115*b*. For this example, the packet is destined for network host 205. As such, the source IP address of the packet is 5.6.7.8 and the destination IP address of the packet is 3.0.0.1. In addition, the source port of the packet is 2020 in this example. Once local routing context 120*b* receives the packet, routing manager 310 performs, at 330, a lookup of routing table 305 using the destination IP address of the packet. The destination IP address of the packet does not match any route in routing table 305 for this example. Thus, the lookup results in a lookup miss.

In this example, local routing context 120*b* is configured to perform a set of NAT operations on the packet when a lookup miss happens. Also, local routing context 120*b* is allocated its own public IP address of 20.0.0.2. In response to the lookup miss, routing manager 310 instructs, at 330, NAT manager 315 to perform the set of NAT operations on the packet. The set of NAT operations include, for this example, replacing the source IP address of the packet with the public IP address allocated to local routing context 120*b*. Hence, NAT manager 315 replaces the source IP address of the packet (5.6.7.8 in this example) with the public IP address allocated to local routing context 120*b* (20.0.0.2 in this example). NAT manager 215 then stores, at 335, a mapping in NAT data storage 130 that maps local routing context 120*b* and the original source IP address of the packet (5.6.7.8 in this example) to the public IP address allocated to the local routing context 120*b* (20.0.0.2 in this example) and the source port of the packet (2020 in this example). The following Listing 2 conceptually illustrates the mapping that NAT manager 315 stores in NAT data storage 130:

LRC 120*b*, 5.6.7.8↔20.0.0.2, 2020

Listing 2

Next, routing manager 310 sends, at 340, the packet to shared routing context 125 for processing. When routing manager 225 receives the packet, routing manager 225 performs, at 345, a lookup of routing table 220 using the destination IP address of the packet (3.0.0.1 in this example). Since the destination IP address of this packet is the same as that in the previous example operation, the lookup results in routing manager 225 finding the same entry as a match for the packet in this example. In response to the lookup, routing manager 225 modifies the destination MAC address of the packet with the MAC address of the next hop (which is the same next hop as the previous example operation) and then forwards, at 350, the packet to the next hop through network interface 115*e* so the packet can reach network host 205 via public network 135.

As illustrated by the two aforementioned example outbound processing data flows described above, a single public route that is common across local routing contexts 120*a* and 120*b* is used to process packets received at local routing contexts 120*a* and 120*b*. Instead of storing the public route in each of the routing tables of local routing contexts 120*a* and 120*b*, one public route is stored in the routing table of shared routing context 125 thereby reducing the number of entries stored in routing tables. One of ordinary skill in the art will understand that the public route shared across local routing contexts 120*a* and 120*b* may also be shared with other local routing contexts. For example, local routing context 120*c* may be configured to process packets for network interface 115*c*, which is communicatively coupled to network host 105*c*. If network host 105*c* sends a packet via network interface 115*c* to network device 110, a lookup miss would occur when local routing context 120*c* performs a lookup on its routing table using the destination IP address of the packet. As a result, local routing context 120*c* would send the packet to shared routing context 125, which would perform a lookup on its routing table and route the packet using the same public route.

Furthermore, in the example outbound processing data flows, a part of processing a packet, a first lookup is performed on the routing table of a local routing context and a second lookup is performed on the routing table of a shared routing context. These lookups may be performed sequentially in some embodiments. For example, the first lookup can be performed and then the second lookup can be performed after. In some cases, the lookups can be performed sequentially by first performing the first lookup. Then, a unique identifier associated with the shared routing context is added to a header of the packet, the packet is recirculated back through the network device. After the packet is recirculated, the header of the packet is analyzed to identify the unique identifier associated with the shared routing context. In response to identifying the unique identifier associated with the shared routing context, the packet is sent to the shared routing table for the second lookup to be performed. In some embodiments, the first lookup and the second lookup may be performed speculatively by performing them in parallel. That is, the first lookup and the second lookup can be performed at, or approximately, the same time. This way, the results of the second lookup is immediately available after the first lookup is performed.

3. Example Inbound Processing

Figure 4:
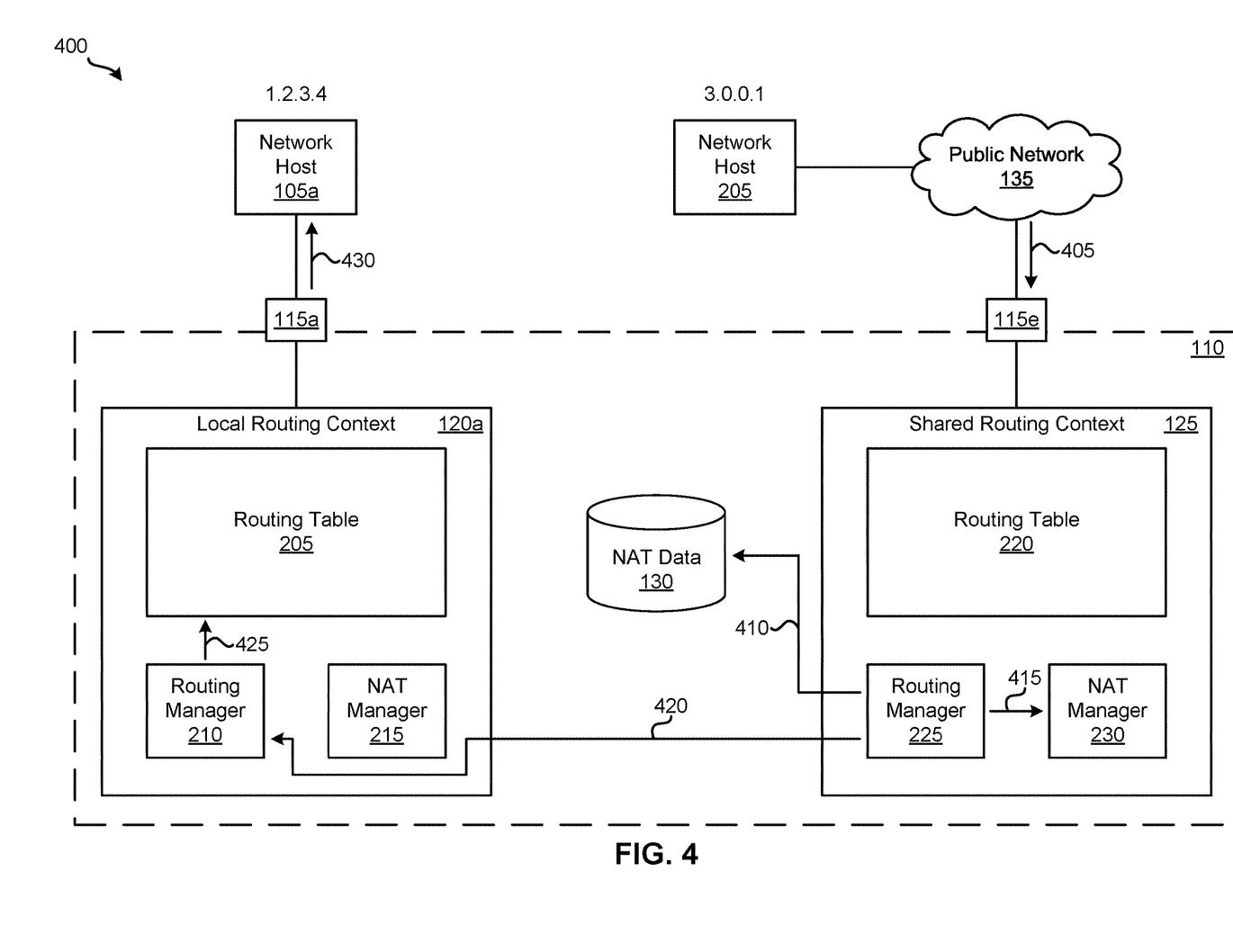
FIG. 4 illustrates an example inbound processing data flow through the network device illustrated in FIG. 1 according to some embodiments.

Yet another example operation will now be described by reference to FIG. 4. FIG. 4 illustrates an example inbound processing data flow 400 through network device 110 according to some embodiments. As mentioned above, shared routing context 125 may receive packets back from a network host in public network 135 after the network host in public network 135 receives packets from a network host 105. In this example, network host 205 is sending a packet back to network device 110 in response to network host 205 receiving the packet from network host 105a in the first example operation described above.

The example operation starts by network device 110 receiving, at 405, the packet from network host 205 via network interface 115e. In this example, the packet is destined for network device 110. Since this packet is being sent in response to a packet sent from network host 105a, the destination IP address of the packet is 20.0.0.1, which the IP address allocated to local routing context 120a, and the destination port is 1010. Additionally, the source IP address of the packet is 3.0.0.1.

After shared routing context 125 receives the packet, routing manager 310 performs, at 410, a lookup of NAT data storage 130 using the destination IP address and the destination port of the packet. Based on the lookup, routing manager 225 determines that the mapping shown in Listing 1 matches the packet. Accordingly, routing manager 225 instructs, at 415, NAT manager 230 to perform NAT operations on the packet based on the determined mapping. In response to the instructions, NAT manager 230 replaces the destination IP address of the packet (20.0.0.1 in this example) with the local IP address specified in the mapping (1.2.3.4 in this example). Next, routing manager 225 sends, at 420, the packet to local routing context 120a for processing.

Upon receiving the packet, routing manager 210 performs, at 425, a lookup of routing table 205 using the destination IP address of the packet (which is now 1.2.3.4). For this example, an entry in routing table 205 specifies a route that matches the IP address of network host 105a and specifies network interface 115a as the egress network interface. Thus, based on the lookup, routing manager 210 finds this entry as a match for the packet. In response to the lookup, routing manager 210 modifies the destination MAC address of the packet with the MAC address of the next hop (which is the MAC address of network host 105a in this example) and then forwards, at 430, the packet to the next hop through network interface 115a so the packet can reach network host 105a.

4. Example Process

Figure 5:
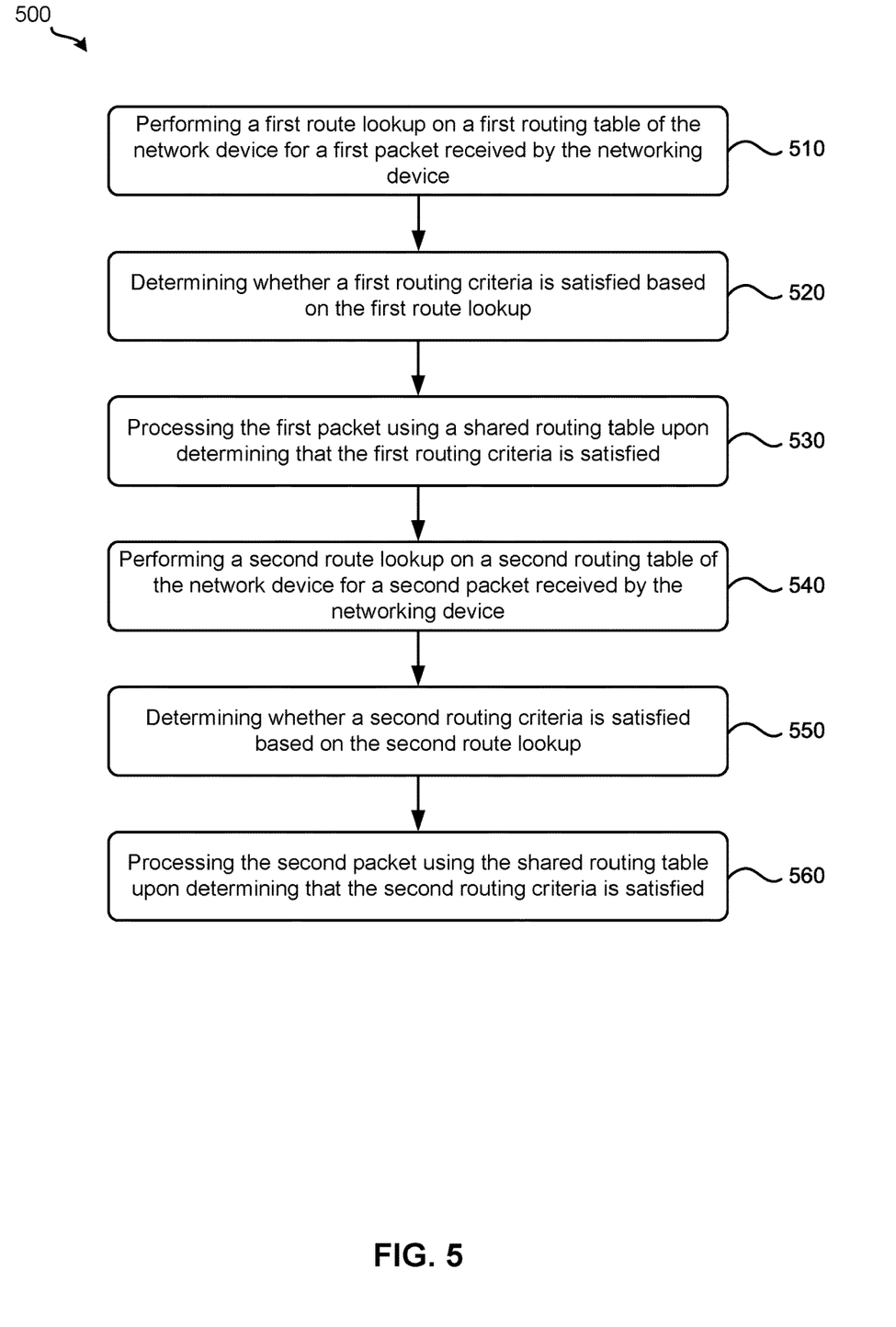
FIG. 5 illustrates a process for sharing routing tables according to some embodiments.

FIG. 5 illustrates a process 500 for sharing routing tables according to some embodiments. In some embodiments, network device 110 performs process 500. Process 500 begins by performing, at 510, a first route lookup on a first routing table of the network device for a first packet received by the networking device. Referring to FIG. 2 as an example, local routing context 120a may receive a packet from network host 105a that is destined for network host 205. When local routing context 120a receives the packet, routing manager 210 performs a lookup of routing table 205 using the destination IP address of the packet.

Next, process determines, at 520, whether a first routing criteria is satisfied based on the first route lookup. Referring to FIG. 2 as an example, a lookup miss may be the first routing criteria. Since the lookup of routing table 205 using the destination IP address of the packet results in a lookup miss, routing manager 210 determines that the first routing criteria is satisfied. In this example, routing manager 210 instructs NAT manager 215 to perform NAT operations on the packet and then routing manager 210 sends the packet to shared routing context 125.

Then, process 500 processes, at 530, the first packet using a shared routing table upon determining that the first routing criteria is satisfied. Referring to FIG. 2 as an example, when routing manager 225 receives the packet, routing manager 225 performs, at 260, a lookup of routing table 220 using the destination IP address of the packet. Based on the lookup, routing manager 225 finds an entry in routing table 220 that specifies a route that matches the destination IP address of the packet and specifies network interface 115e as the egress network interface. Routing manager 225 then modifies the destination MAC address of the packet with the MAC address of the next hop and forwards the packet to the next hop through network interface 115e so the packet can reach network host 205 via public network 135.

At 540, process 500 performs a second route lookup on a second routing table of the network device for a second packet received by the networking device. Referring to FIG. 3 as an example, local routing context 120b may receive a packet from network host 105b that is destined for network host 205. Once local routing context 120b receives the packet, routing manager 310 performs a lookup of routing table 305 using the destination IP address of the packet.

Process then determines, at 550, whether a second routing criteria is satisfied based on the second route lookup. Referring to FIG. 3 as an example, a lookup miss may be the second routing criteria. Because the lookup of routing table 305 using the destination IP address of the packet results in a lookup miss, routing manager 310 determines that the second routing criteria is satisfied. For this example, routing manager 310 instructs NAT manager 315 to perform NAT operations on the packet, which routing manager 310 sends to shared routing context 125.

Finally, process 500 processes, at 560, the second packet using the shared routing table upon determining that the second routing criteria is satisfied. Referring to FIG. 3 as an example, upon receiving the packet, routing manager 225 performs, a lookup of routing table 220 using the destination IP address of the packet. Based on the lookup, routing manager 225 finds the same entry in routing table 220 as that found in operation 530, which specifies a route that matches the destination IP address of the packet and specifies network interface 115e as the egress network interface. Next, routing manager 225 modifies the destination MAC address of the packet with the MAC address of the next hop and forwards the packet to the next hop through network interface 115e so the packet can reach network host 205 via public network 135.

5. Example Network Device

Figure 6:
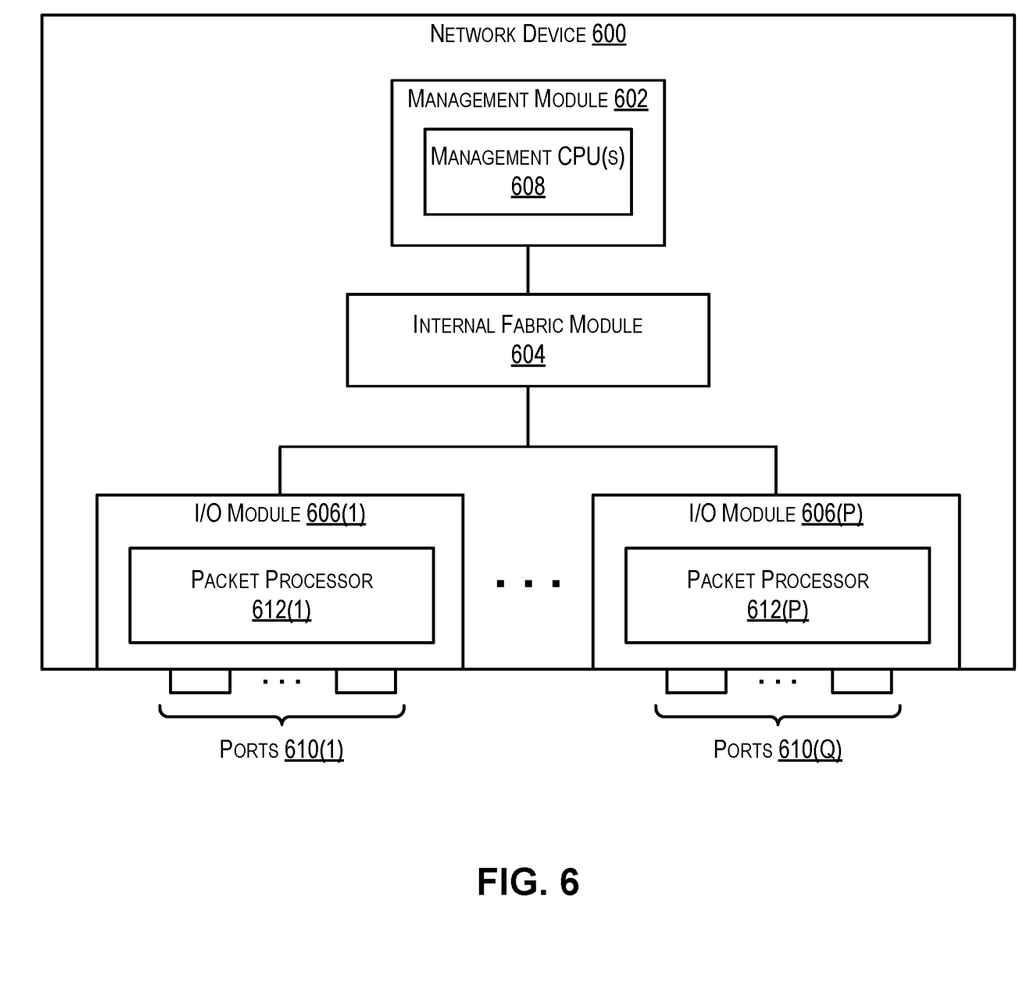
FIG. 6 illustrates an example network device according to certain embodiments.

FIG. 6 illustrates the architecture of an example network device (e.g., a network switch or router) 600 that may implement the techniques of the present disclosure according to certain embodiments. For example, network device 600 may correspond to network device 102 shown in FIG. 1.

Network device 600 includes a management module 602, an internal fabric module 604, and a number of I/O modules 606(1)-(P). Management module 602 includes one or more management CPUs 608 for managing/controlling the operation of the device. Each management CPU 608 can be a general-purpose processor, such as an Intel/AMD x86 or ARM-based processor, that operates under the control of program code maintained in an associated volatile memory and/or stored in a non-transitory computer readable storage medium (not shown). In one set of embodiments, this program code can include code for implementing some or all of the techniques described in the foregoing sections.

Internal fabric module 604 and I/O modules 606(1)-(P) collectively represent the data, or forwarding, plane of network device 600. Internal fabric module 604 is configured to interconnect the various other modules of network device 600. Each I/O module 606 includes one or more input/output ports 610(1)-(Q) that are used by network device 600 to send and receive network packets. Each I/O module 606 can also include a packet processor 612, which is a hardware processing component that can make wire speed decisions on how to handle incoming or outgoing network packets.

It should be appreciated that network device 600 is illustrative and other configurations having more or fewer components than network device 600 are possible.

6. Further Examples

In some embodiments, a method performs a first route lookup on a first routing table of a network device using a first packet received by the networking device. The method further determines whether a first routing criteria is satisfied based on the first route lookup. The method also processes the first packet using a shared routing table upon determining that the first routing criteria is satisfied. The method further performs a second route lookup on a second routing table of the network device using a second packet received by the networking device. The method also determines whether a second routing criteria is satisfied based on the second route lookup. The method further processes the second packet using the shared routing table upon determining that the second routing criteria is satisfied.

In some embodiments, the method may further perform a set of network address translation (NAT) operations on a source network address of the first packet before processing the first packet using the shared routing table.

In some embodiments, the set of NAT operations may include replacing the source network address of the first packet with a public network address. The method may further store a mapping that maps the first routing table and the source network address of the first packet to the public network address.

In some embodiments, the set of NAT operations is a first set of NAT operations, the method further comprising performing a second set of NAT operations on a source network address of the second packet before processing the second packet using the shared routing table.

In some embodiments, the public network address may be a first public network address. The mapping may be a first mapping. The second set of NAT operations may include replacing the source network address of the second packet with a second public network address. The method may further store a second mapping that maps the second routing table and the source network address of the second packet to the second public network address.

In some embodiments, the first public network address and the second public network address may be the same. The public network address may be a first public network address. The first mapping may further map the first routing table and the source network address of the first packet to the public network address and the source port of the first packet. The second mapping may further map the second routing table and the source network address of the second packet to the second public network address and the source port of the second packet.

In some embodiments, the first packet may be destined for a network host in a public network. The method may further receive a third packet from the network host in the public network and determine whether to perform a second set of network address translation operations on a destination network address of the third packet based on the destination network address of the third packet.

In some embodiments, the method may further, upon determining to perform the second set of network address translation operations on the destination network address of the third packet, replace destination network address of the third packet with the source network address of the first packet.

In some embodiments, the method may further receive the first packet at a first network interface of the network device. The first routing table may be included in a first routing context configured to process packets received at the first network interface of the network device. The method may also receive the second packet at a second network interface of the network device. The second routing table may be included in a second routing context configured to process packets received at the second network interface of the network device.

In some embodiments, the first routing criteria may include a route lookup miss.

In some embodiments, the first routing criteria may include a route lookup that finds an entry in the first routing table that matches the first packet. The entry may specify to process the first packet using the shared routing table.

In some embodiments, the first routing criteria and the second routing criteria may be the same.

In some embodiments, processing the first packet using the shared routing table may include performing a third route lookup on the shared routing table using the first packet.

In some embodiments, performing the first route lookup on the first routing table of the network device using the first packet and performing the third route lookup on the shared routing table using the first packet may be executed in parallel.

In some embodiments, performing the third route lookup on the shared routing table using the first packet may be executed sequentially after performing the first route lookup on the first routing table of the network device using the first packet.

In some embodiments, the shared routing table may be included in a shared routing context. The method may further, after performing the first route lookup on the first routing table of the network device using the first packet and before performing the third route lookup on the shared routing table using the first packet, add a unique identifier associated with the shared routing context to a header of the first packet; recirculate the first packet back through the network device; analyze the header of the first packet to identify the unique identifier associated with the shared routing context; and, in response to identifying the unique identifier associated with the shared routing context, send the first packet to the shared routing table for processing.

In some embodiments, processing the first packet using the shared routing table may further include, based on the third route lookup on the shared routing table, determining a next hop that allows the first packet to reach a destination having a first destination network address specified in the first packet; modifying a second destination network address of the first packet to be a network address of the next hop; and forwarding the first packet to the next hop.

In some embodiments, the method may further perform a third route lookup on a third routing table of the network device using a third packet received by the networking device, determine whether a third routing criteria is satisfied based on the third route lookup, and process the third packet using the shared routing table upon determining that the third routing criteria is satisfied.

In some embodiments, a non-transitory machine-readable medium stores a program executable by at least one processing unit of a network device. The program performs a first route lookup on a first routing table of the network device for a first packet received by the networking device. The program further determines whether a first routing criteria is satisfied based on the first route lookup. The program also processes the first packet using a shared routing table upon determining that the first routing criteria is satisfied. The program further performs a second route lookup on a second routing table of the network device for a second packet received by the networking device. The program also determines whether a second routing criteria is satisfied based on the second route lookup. The program further processes the second packet using the shared routing table upon determining that the second routing criteria is satisfied.

In some embodiments, a network device includes a set of processing units and a non-transitory machine-readable medium that stores instructions. The instructions cause at least one processing unit to perform a first route lookup on a first routing table of the network device using a first packet received by the networking device. The instructions further cause the at least one processing unit to determine whether a first routing criteria is satisfied based on the first route lookup. The instructions also cause the at least one processing unit to process the first packet using a shared routing table upon determining that the first routing criteria is satisfied. The instructions further cause the at least one processing unit to perform a second route lookup on a second routing table of the network device using a second packet received by the networking device. The instructions also cause the at least one processing unit to determine whether a second routing criteria is satisfied based on the second route lookup. The instructions further cause the at least one processing unit to process the second packet using the shared routing table upon determining that the second routing criteria is satisfied.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
    performing a first route lookup on a first routing table of a network device using a first packet received by the networking device;
    determining whether a first routing criteria is satisfied based on the first route lookup;
    processing the first packet using a shared routing table upon determining that the first routing criteria is satisfied;
    performing a second route lookup on a second routing table of the network device using a second packet received by the networking device;
    determining whether a second routing criteria is satisfied based on the second route lookup; and
    processing the second packet using the shared routing table upon determining that the second routing criteria is satisfied.

2. The method of claim 1 further comprising performing a set of network address translation (NAT) operations on a source network address of the first packet before processing the first packet using the shared routing table.

3. The method of claim 2, wherein the set of NAT operations comprises replacing the source network address of the first packet with a public network address, the method further comprising storing a mapping that maps the first routing table and the source network address of the first packet to the public network address.

4. The method of claim 3, wherein the set of NAT operations is a first set of NAT operations, the method further comprising performing a second set of NAT operations on a source network address of the second packet before processing the second packet using the shared routing table.

5. The method of claim 4, wherein the public network address is a first public network address, wherein the mapping is a first mapping, wherein the second set of NAT operations comprises replacing the source network address of the second packet with a second public network address, the method further comprising storing a second mapping that maps the second routing table and the source network address of the second packet to the second public network address.

6. The method of claim 5, wherein the first public network address and the second public network address are the same, wherein the public network address is a first public network address, wherein the first mapping further maps the first routing table and the source network address of the first packet to the public network address and the source port of the first packet, wherein the second mapping further maps the second routing table and the source network address of the second packet to the second public network address and the source port of the second packet.

7. The method of claim 3, wherein the first packet is destined for a network host in a public network, the method further comprising:
    receiving a third packet from the network host in the public network; and
    determining whether to perform a second set of network address translation operations on a destination network address of the third packet based on the destination network address of the third packet.

8. The method of claim 7 further comprising, upon determining to perform the second set of network address translation operations on the destination network address of the third packet, replacing destination network address of the third packet with the source network address of the first packet.

9. The method of claim 1 further comprising:
receiving the first packet at a first network interface of the network device, wherein the first routing table is included in a first routing context configured to process packets received at the first network interface of the network device; and
receiving the second packet at a second network interface of the network device, wherein the second routing table is included in a second routing context configured to process packets received at the second network interface of the network device.

10. The method of claim 1, wherein the first routing criteria comprises a route lookup miss.

11. The method of claim 1, wherein the first routing criteria comprises a route lookup that finds an entry in the first routing table that matches the first packet, the entry specifying to process the first packet using the shared routing table.

12. The method of claim 1, wherein the first routing criteria and the second routing criteria are the same.

13. The method of claim 1, wherein processing the first packet using the shared routing table comprises performing a third route lookup on the shared routing table using the first packet.

14. The method of claim 13, wherein performing the first route lookup on the first routing table of the network device using the first packet and performing the third route lookup on the shared routing table using the first packet are executed in parallel.

15. The method of claim 13, wherein performing the third route lookup on the shared routing table using the first packet is executed sequentially after performing the first route lookup on the first routing table of the network device using the first packet.

16. The method of claim 15, wherein the shared routing table is included in a shared routing context, the method further comprising, after performing the first route lookup on the first routing table of the network device using the first packet and before performing the third route lookup on the shared routing table using the first packet:
adding a unique identifier associated with the shared routing context to a header of the first packet;
recirculating the first packet back through the network device;
analyzing the header of the first packet to identify the unique identifier associated with the shared routing context; and
in response to identifying the unique identifier associated with the shared routing context, sending the first packet to the shared routing table for processing.

17. The method of claim 13, wherein processing the first packet using the shared routing table further comprises:
based on the third route lookup on the shared routing table, determining a next hop that allows the first packet to reach a destination having a first destination network address specified in the first packet;
modifying a second destination network address of the first packet to be a network address of the next hop; and
forwarding the first packet to the next hop.

18. The method of claim 1 further comprising:
performing a third route lookup on a third routing table of the network device using a third packet received by the networking device;
determining whether a third routing criteria is satisfied based on the third route lookup; and
processing the third packet using the shared routing table upon determining that the third routing criteria is satisfied.

19. A non-transitory machine-readable medium storing a program executable by at least one processing unit of a network device, the program comprising sets of instructions for:
performing a first route lookup on a first routing table of the network device for a first packet received by the networking device;
determining whether a first routing criteria is satisfied based on the first route lookup;
processing the first packet using a shared routing table upon determining that the first routing criteria is satisfied;
performing a second route lookup on a second routing table of the network device for a second packet received by the networking device;
determining whether a second routing criteria is satisfied based on the second route lookup; and
processing the second packet using the shared routing table upon determining that the second routing criteria is satisfied.

20. A network device comprising:
a set of processing units; and
a non-transitory machine-readable medium storing instructions that when executed by at least one processing unit in the set of processing units cause the at least one processing unit to:
perform a first route lookup on a first routing table of the network device using a first packet received by the networking device;
determine whether a first routing criteria is satisfied based on the first route lookup;
process the first packet using a shared routing table upon determining that the first routing criteria is satisfied;
perform a second route lookup on a second routing table of the network device using a second packet received by the networking device;
determine whether a second routing criteria is satisfied based on the second route lookup; and
process the second packet using the shared routing table upon determining that the second routing criteria is satisfied.

* * * * *